US006660787B2

(12) United States Patent
Mahood et al.

(10) Patent No.: US 6,660,787 B2
(45) Date of Patent: Dec. 9, 2003

(54) TRANSPARENT, FIRE-RESISTANT POLYCARBONATE COMPOSITIONS

(75) Inventors: James Alan Mahood, Evansville, IN (US); Niles Richard Rosenquist, Evansville, IN (US); Rajendra Kashinath Singh, Evansville, IN (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 09/908,168

(22) Filed: Jul. 18, 2001

(65) Prior Publication Data

US 2003/0027905 A1 Feb. 6, 2003

(51) Int. Cl.[7] .............. C08L 53/00; C08K 5/42
(52) U.S. Cl. .............. 524/164; 524/162; 524/394; 524/400; 524/505; 524/588
(58) Field of Search ................. 524/588, 162, 524/164, 394, 40, 505

(56) References Cited

U.S. PATENT DOCUMENTS

| 3,154,008 A | 4/1963 | Hurter ............ 425/335 |
| 3,189,662 A | 6/1965 | Vaughn Jr. ........ 528/33 |
| 3,419,634 A | 12/1968 | Vaughn, Jr. ....... 528/29 |
| 3,419,635 A | 12/1968 | Vaughn, Jr. ....... 528/29 |
| 3,635,895 A | 1/1972 | Kramer ........... 525/462 |
| 3,775,267 A | 11/1973 | Yahalom ........... 204/47 |
| 4,001,184 A | 1/1977 | Scott ............. 528/182 |
| 4,217,438 A | 8/1980 | Brunelle et al. ... 528/202 |
| 4,732,949 A | 3/1988 | Paul et al. ....... 525/464 |
| 4,774,273 A | 9/1988 | Kress et al. ...... 524/168 |
| 4,925,891 A | 5/1990 | Kress et al. ...... 524/139 |
| 4,994,532 A | 2/1991 | Hawkins et al. ... 525/464 |
| 5,068,302 A | 11/1991 | Horlacher et al. .. 528/21 |
| 5,445,310 A | 8/1995 | Folmer ............ 525/531 |
| 5,449,710 A | 9/1995 | Umeda et al. ...... 524/161 |
| 5,616,674 A | 4/1997 | Michel et al. ..... 528/29 |
| 6,072,011 A | 6/2000 | Hoover ............ 525/464 |
| 6,133,394 A | 10/2000 | Furukawa et al. ... 528/15 |
| 6,184,312 B1 | 2/2001 | Yamamoto et al. .. 525/474 |

FOREIGN PATENT DOCUMENTS

| EP | 062 547 | 11/1994 |
| EP | 0933 387 | 8/1999 |
| JP | 08176427 | 7/1996 |

OTHER PUBLICATIONS

Tarbell, D. Stanley, *The Claisen Rearrangement*, Chemical Reviews 27, pp. 495–546 (1940).

*Primary Examiner*—Peter Szekely

(57) ABSTRACT

A transparent, fire resistant branched polycarbonate-polysiloxane composition comprises polycarbonate, a short-chained polydiorganosiloxane, a branching agent, and flame retardants essentially free of bromine or chlorine, wherein the amount of short-chained polydiorganosiloxane is about 1 wt. % or less.

19 Claims, No Drawings

TRANSPARENT, FIRE-RESISTANT POLYCARBONATE COMPOSITIONS

FIELD OF THE INVENTION

This invention relates to fire resistant polycarbonate compositions and more particularly transparent, fire resistant polycarbonate compositions.

BACKGROUND OF THE INVENTION

Polycarbonate is widely used in the manufacture of molded parts because of its excellent impact resistance, high heat distortion temperature, and transparency. Flame-retardant grades of polycarbonate have been developed for applications such as housings for electronic devices, where safety considerations require certain levels of flame-resistance. These flame-retardant polycarbonates are typically prepared using bromine- or chlorine-containing flame-retardants. Recently, concerns about environmental contamination from the bromine- or chlorine-containing flame-retardants has created a need for transparent polycarbonates that contain little or no bromine or chlorine. Moreover, as molded parts become larger and contain more plastic, there is a need for flame-retardant grades that can pass more stringent flame-retardant testing, such as that set out in the Underwriter's Laboratory 5V A test protocol.

Siloxane additives have been used to improve the flame retardancy of polycarbonate as taught by U.S. Pat. Nos. 5,449,710 and 6,184,312, but may create certain performance issues in certain applications. Siloxane additives may migrate to the surface of molded parts and affect their performance. They may volatize from the parts and affect the performance of nearby electrical components. In a different embodiment, U.S. Pat. Nos. 3,189,662; 3,419,635; 4,732,949 and 5,068,302 disclose a variety of polycarbonate/siloxane copolymer structures that overcome the problems associated with siloxane additives. In yet another teaching, U.S. Pat. No. 6,072,011 discloses a polycarbonate/siloxane copolymer based on 4–8 wt. % of a eugenol-capped linear siloxane with block lengths of 45–55 dimethylsiloxane units. This material provides excellent hydrolytic stability, low temperature ductility, and 5V flame-retardant performance at 3 mm thickness, but the material is not transparent.

Applicants have surprisingly found that by dramatically lowering the amount of short-chained eugenol-capped siloxanes, one obtains a transparent branched polysiloxane-polycarbonate block copolymer that meets the more stringent UL 5V ratings, and which is essentially free of volatile siloxanes and bromine or chlorine-containing flame retardants.

BRIEF SUMMARY OF THE INVENTION

The invention relates to a transparent branched polysiloxane-polycarbonate block copolymer composition comprising less than 1 wt. % of an eugenol-capped siloxane having block lengths of 5–15 dimethyl siloxane units, wherein the polycarbonate composition has a UL94 5V rating at thickness greater than or equal to about 4 millimeters.

The invention also relates to a process for preparing a branched polysiloxane-polycarbonate block copolymer composition comprising less than 1 wt. % of an eugenol-capped siloxane having block lengths of 5–15 dimethyl siloxane units.

DETAILED DESCRIPTION OF THE INVENTION

Transparent is herein defined as having a percent transmission of about 85 or greater and a haze value of about 5 or less when measured according to ASTM D1003, which is incorporated herein by reference, at a thickness of 3.2 mm.

Polydiorganosiloxane/polycarbonate block copolymers are well-known in the art, see for example U.S. Pat. Nos. 3,189,662; 3,419,634; 4,732,949; and 5,068,302 which are incorporated here by reference disclosing resins comprising polycarbonate and polysiloxane blocks and processes for preparing polycarbonate-polysiloxane block copolymers.

Polycarbonate Block.

The polycarbonate blocks in the composition of the present invention comprise recurring units of formula I:

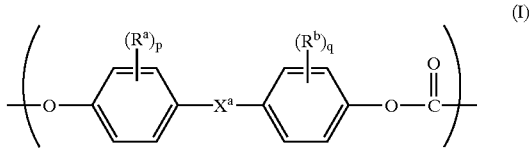

(I)

wherein $R^a$ and $R^b$ each represent a monovalent hydrocarbon group and may be the same or different; p and q are each independently integers from 0 to 4; and $X^a$ represents one of the groups of formula:

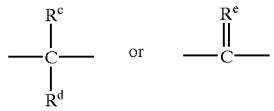

wherein $R^c$ and $R^d$ each independently represent a hydrogen atom or a monovalent linear or cyclic hydrocarbon group and $R^e$ is a divalent hydrocarbon group.

The polycarbonate blocks may be prepared by reacting a dihydroxy compound such as bisphenol with a carbonate precursor such as phosgene, a haloformate, a carbonate or a carbonate ester, generally in the presence of an acid acceptor and a molecular weight regulator. It is also possible that the block copolymer may be made by other methods known in the art for making polycarbonates such as transesterification as disclosed in U.S. Pat. No. 3,154,008.

Useful polymerization methods include interfacial polymerization, melt polymerization, and redistribution.

As used herein, the term "dihydroxy compound" includes, for example, bisphenol compounds of formula II:

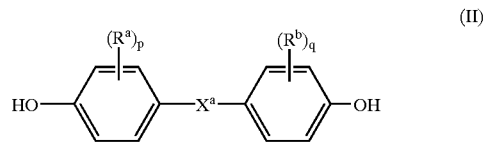

(II)

wherein $R^a$ and $R^b$ each represent a monovalent hydrocarbon group and may be the same or different; p and q are each independently integers from 0 to 4; and $X^a$ represents one of the groups of formula:

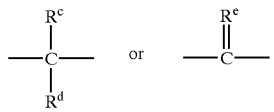

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (II) includes: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis (hydroxyaryl) alkanes such as 2,2-bis(4-hydroxyphenyl) propane; 1,1-bis(4-hydroxyphenyl) cyclopentane; and bis (hydroxyaryl) cycloalkanes such as 1,1-bis(4-hydroxyphenyl) cyclohexane.

It is also possible to employ two or more different dihydroxy compounds or copolymers of a dihydroxy compound with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed.

Siloxane Block.

The siloxane blocks for use in preparing the branched copolymer of the invention may be characterized as bisphenolsiloxanes. The preparation of these bisphenolsiloxanes is accomplished by the addition of a polydiorganosiloxane to a phenol containing an alkenyl substituent, according to the schematic formula:

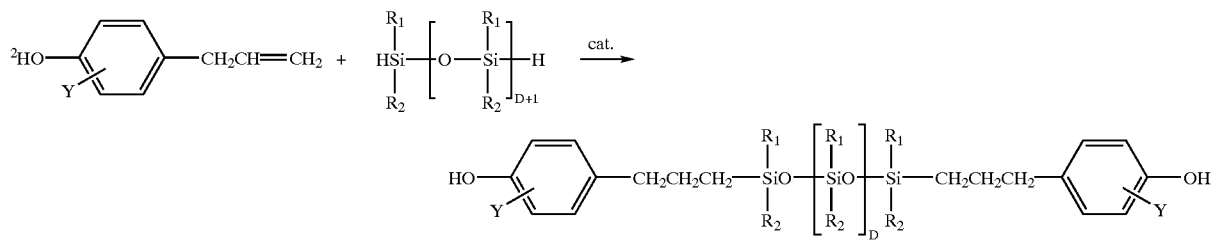

wherein R1 and R2 are each independently hydrocarbyl and where D is an integer of from about 5 to about 20. In one embodiment, R1 is methyl and R2 is methyl or phenyl, and D is about 5–15.

The essential features of the process to prepare the bisphenolsiloxanes are described by Vaughn, U.S. Pat. No. 3,419,635 (December 1968). For instance, the process is exemplified in example 8 of this Vaughn patent which describes the addition of a hydrogen-terminated polydimethylsiloxane to an allylphenol in the presence of a catalytic amount of chloroplatinic acid-alcohol complex at 90–115.degree. C.

In one embodiment, the polysiloxane blocks are made from bisphenolpolysiloxanes where R1 and R2 are methyl, and where Y is methoxy located ortho to the phenolic substituent. These are readily prepared by addition of a hydrogen-terminated polysiloxane to two molar equivalents of eugenol (4-allyl-2-methoxyphenol) in a reaction advantageously catalyzed by platinum or its compounds.

The allylphenols in the schematic formula above are also well known compounds, described along with methods for their preparation, by Tarbell, Chemical Reviews 27, 495ff (1940). In one embodiment, the allylphenol is eugenol, 4-allyl-2-methoxyphenol, since it is readily available as a synthetic or as a natural product and affords a bisphenolpolysiloxane of favorable reactivity.

The polysiloxane blocks and optional salt based flame retardant(s) are present in quantities effective to achieve a UL94 5V rating at 4 mm. In one embodiment, the polysiloxane blocks are present in an amount of less than 1 wt. %. In a second embodiment, the amount is about 0.25 to 0.75 wt. %, based on the total resin weight. In yet a third embodiment, the amount is about 0.5 wt. %.

Branching Agents.

The branched copolymers of the present invention are prepared by adding a branching agent during polymerization. Branching agents are well-known in the art and may comprise polyfunctional organic compounds containing at least three functional groups which may be hydroxyl, carboxyl, carboxylic anhydride, carboxylic acid chloride and mixtures thereof.

Specific examples include trimellitic acid, trimellitic anhydride, trimellitic trichloride, tris-p-hydroxy phenyl ethane ("THPE"), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol, trimesic acid and benzophenone tetracarboxylic acid.

The branching agents may be added at a level of about 0.05–2.0 weight percent.

Optional Flame Retardants.

The composition of the present invention may further comprise non-volatile siloxane flame retardants salt based flame retardants including alkali metal or alkaline earth metal salts of inorganic protonic acids as well as organic Brönsted acids comprising at least one carbon atom. In one embodiment, the salt based flame retardants are sulphonates selected from the group consisting of potassium diphenylsulfon-3-sulphonate (KSS), potassium-perfluorobutane-sulphonate (KPFBS) and combinations comprising at least one of the foregoing.

Salt based flame retardants may be used in amounts of about 0.01 wt % to about 1.0 wt % based on the total resin weight. In one embodiment, the salt based flame retardant is KPFBS with the amount of KPFBS being about 0.05 wt % to about 0.12 wt % based on the total resin weight. In a second embodiment wherein the salt based flame retardant is KSS, the amounts are about 0.35 wt % or less based on the total resin weight.

Optional Additives

The composition of the present invention may include various additives ordinarily incorporated in resin compositions of this type. Such additives are, for example, heat stabilizers; antioxidants; light stabilizers; plasticizers; antistatic agents; mold releasing agents; additional resins; blowing agents; and the like.

Such additives are known to the art of plastics compounding, and may include, for example, about 0.01 to about 0.1 part by weight of a heat stabilizer; about 0.01 to about 0.2 part by weight of an antioxidant; about 0.1 to about 0.7 part by weight of a light stabilizer; about 0.5 to about 3 parts by weight of a plasticizer; about 0.1 to about 3 parts by weight of an antistatic agent; and about 0.1 to about 1 part by weight of a mold releasing agent. The above amounts of the additives are based on 100 parts by weight of the resin composition.

Examples of heat stabilizers include triphenyl phosphite, tris-(2,6-dimethylphenyl)phosphite, tris-(2,4-di-t-butylphenyl) phosphite, tris-(mixed mono-and di-nonylphenyl) phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl) isocyanurate, tristearin and epoxidized soybean oil. Examples of the antistatic agent include glycerol monostearate, sodium stearyl sulfonate, and sodium dodecylbenzenesulfonate. Examples of mold releasing agents include pentaerythritoltetrastearate, stearyl stearate, beeswax, montan wax and paraffin wax. Combinations of any of the foregoing additives may be used. Such additives may be mixed at a suitable time during the mixing of the components for forming the composition.

Preparation.

The conversion of the bisphenolpolysiloxane, the dihydroxy compound such as bisphenol, and branching agents into the branched polycarbonate/siloxane block copolymers of the invention may be conducted by known processes for making branched polycarbonates, as described in U.S. Pat. Nos. 3,635,895 and 4,001,184 which are incorporated by reference. All types of polycarbonate end groups are contemplated as being within the scope of the present invention.

In one embodiment, the transparent, fire resistant polycarbonate composition may be synthesized by charging a polymerization vessel with the polysiloxane, aromatic or aliphatic dihydroxy compound, organic solvent, water, end-capping agent, and a tertiary amine. The reaction mixture is stirred vigorously, and phosgene is bubbled through the solution while the pH is maintained between about 8 and 11 by addition of aqueous caustic solution.

When the reaction is complete, the organic layer is separated from the aqueous layer, washed with dilute hydrochloric acid and then washed with deionized water. The solvent is removed, for example by steam precipitation or anti-solvent precipitation, and the polymer is dried.

The composition of the present invention and optional additives may be compounded using any known mixing method. In one embodiment, the raw materials are added directly into the feed section of a melt mixing device (such as an extruder) via separate feed systems. In the melt mixing step, the ingredients are typically melt kneaded in a single screw or twin screw extruder, and extruded as pellets.

The compositions of the present invention may be used for any applications wherein their key properties of transparency, heat resistance, toughness, UV stability, and flame retardancy are required. The moldings may be produced by extrusion or injection molding.

EXAMPLES

The invention is further illustrated by the following non-limiting Examples. In all examples, all amounts are weight percent based on the total resin weight unless otherwise indicated.

Preparation of D10 Fluid.

In this example, eugenol-capped polymethylsiloxane fluid with a degree of polymerization of about 10 Me2SiO units per molecule (hereinafter "D10 fluid") is prepared. Octamethylcyclotetrasiloxane (8.3 kg, 28.0 moles), tetramethyldisiloxane (1.7 kg, 12.3 moles) and Filtrol 20 (172 g, 1% by weight from Harshaw/Filtrol Clay Products) are combined in a 12 L flask and heated to 45° C. for 2 hrs. The temperature is then raised to 100° C. and the mixture is rapidly agitated for 5 hrs. The mixture is allowed to cool and then filtered through a plug of Celite filtering aid. To the crude product, a mixture of eugenol (3.9 kg, 23.6 moles) and Karstedt's platinum catalyst (3.0 g, 100 ppm Pt) is added at a rate of about 40 g/min. Reaction completion is monitored by the disappearance of the siloxane hydrogen in the infrared spectrum. The reaction product is stripped of volatiles by a falling thin film evaporator operating at 200° C. and 1.5 torr. The isolated polysiloxane material is a light brown oil with a degree of polymerization of about 10 siloxane units, to be used without further purification.

Resin A (No Polysiloxane Present).

Bisphenol A (8969 g, 39.3 mol) and 1,1,1-tris(4-hydroxyphenyl)ethane (30 g, 0.10 mol, hereafter THPE) are charged to a 100L agitated reactor, along with methylene chloride (40L), water (23L), triethylamine (70 ml), sodium gluconate (17 g), and p-cumylphenol (376 g, 4.5 mole %). In the next step, phosgene (4582 g, 46.3 mol) is added at 150 g/min rate while the pH is held at 10.0–10.5 via controlled addition of a 50% caustic solution.

When the reaction is complete, the resulting polymer solution is separated from the brine layer, diluted with an additional 23L methylene chloride, washed with dilute HCl solution, and then washed with water until the level of titratable chloride is less than 3 ppm. The polymer is isolated as white granules by steam precipitation and dried.

Resin B (About 1 wt. % Polysiloxane Present).

Bisphenol A (8969 g, 39.3 mol), D10 fluid (as prepared above, 88 g, 0.21 mole) and THPE (30 g, 0.10 mol) are charged to a 100L agitated reactor, along with methylene chloride (40L), water (23L), triethylamine (70 ml), sodium gluconate (17 g), and p-cumylphenol (376 g, 4.5 mole %). In the next step, phosgene (4582 g, 46.3 mol) is added at 150 g/min rate while the pH is held at 10.0–10.5 via controlled addition of a 50% caustic solution.

When the reaction is complete, the resulting polymer solution is separated from the brine layer, diluted with an additional 23L methylene chloride, washed with dilute HCl solution, and then washed with water until the level of titratable chloride is less than 3 ppm. The polymer is isolated as white granules by steam precipitation and dried.

Resin C (About 3 wt. % Polysiloxane Present).

Bisphenol A (8969 g, 39.3 mol), D10 fluid (as prepared above, 254 g, 0.63 mole) and THPE (30 g, 0.10 mol) are charged to a 100L agitated reactor, along with methylene chloride (40L), water (23L), triethylamine (70 ml), sodium gluconate (17 g), and p-cumylphenol (376 g, 4.5 mole %). In the next step, phosgene (4582 g, 46.3 mol) is added at 150 g/min rate while the pH is held at 10.0–10.5 via controlled addition of a 50% caustic solution.

When the reaction is complete, the resulting polymer solution is separated from the brine layer, diluted with an additional 23L methylene chloride, washed with dilute HCl solution, and then washed with water until the level of titratable chloride is less than 3 ppm. The polymer is isolated as white granules by steam precipitation and dried.

Test Resin D (About 5 wt. % Polysiloxane Present).

Bisphenol A (8969 g, 39.3 mol), D10 fluid (as prepared above, 440 g, 1.05 mole) and THPE (30 g, 0.10 mol) are charged to a 100L agitated reactor, along with methylene chloride (40L), water (23L), triethylamine (70 ml), sodium gluconate (17 g), and p-cumylphenol (376 g, 4.5 mole %). In the next step, phosgene (4582 g, 46.3 mol) is added at 150 g/min rate while the pH is held at 10.0–10.5 via controlled addition of a 50% caustic solution.

When the reaction is complete, the resulting polymer solution is separated from the brine layer, diluted with an additional 23L methylene chloride, washed with dilute HCl solution, and then washed with water until the level of titratable chloride is less than 3 ppm. The polymer is isolated as white granules by steam precipitation and dried.

Test Resin E (About 0.5 wt. % Polysiloxane Present).

Bisphenol A (8969 g, 39.3 mol), D10 fluid (as prepared above, 44 g, 0.105 mole) and THPE (30 g, 0.10 mol) are charged to a 100 L agitated reactor, along with methylene chloride (40L), water (23L), triethylamine (70 ml), sodium gluconate (17 g), and p-cumylphenol (376 g, 4.5 mole %). In the next step, phosgene (4582 g, 46.3 mol) is added at 150 g/min rate while the pH is held at 10.0–10.5 via controlled addition of a 50% caustic solution.

When the reaction is complete, the resulting polymer solution is separated from the brine layer, diluted with an additional 23L methylene chloride, washed with dilute HCl solution, and then washed with water until the level of titratable chloride is less than 3 ppm. The polymer is isolated as white granules by steam precipitation and dried.

Test Resin F (Linear Copolymer—No Branching).

Bisphenol A (8969 g, 39.3 mol) and D10 fluid (as prepared above, 44 g, 0.105 mole) are charged to a 100L agitated reactor, along with methylene chloride (40L), water (23L), triethylamine (70 ml), sodium gluconate (17 g), and p-cumylphenol (376 g, 4.5 mole %). In the next step, phosgene (4582 g, 46.3 mol) is added at 150 g/min rate while the pH is held at 10.0–10.5 via controlled addition of a 50% caustic solution.

When the reaction is complete, the resulting polymer solution is separated from the brine layer, diluted with an additional 23L methylene chloride, washed with dilute HCl solution, and then washed with water until the level of titratable chloride is less than 3 ppm. The polymer is isolated as white granules by steam precipitation and dried.

In the examples, the resins are compounded into formulations of: 100 parts resin, 0.08 part potassium perfluorobutanesulfonate (KPFBS), 0.05 part cyclic octaphenyltetrasiloxane, and 0.35 part pentaerythritol tetrastearate. Compounding and pelletization are done using twin-screw extruders. Pelletized resin is dried at 235° C. for four hours, then injection molded into 12.7 mm×1.27 mm×4 mm bars for flame testing.

UL Tests.

In the UL 94 V0 flame application, a flame 20 mm high is applied for 10 seconds two times to each sample. A flameproofed thermoplastic is classified in fire class UL 94 V0 if the following criteria are met: for a set of 5 samples, all samples can continue burning after application of a flame. The sum of the combustion times after 10 flame applications to 5 samples must not be longer than 50 seconds, and no individual combustion time can exceed 10 seconds. None of the samples must drip flaming particles, burn completely or burn with glowing combustion for longer than 30 seconds. For classification in fire class UL 94 V1, the combustion times must not be longer than 30 seconds and the sum of the combustion times for 10 flame applications to 5 samples must not be longer than 250 seconds. Glowing combustion must never last longer than 60 seconds. The other criteria are identical to those mentioned above. A substance is classified in fire class UL 94 V2 when the above criteria for classification as UL 94 V1 are fulfilled and dripping of flaming particles occurs.

In the 5V flame application, a flame 127 mm high with an inner blue cone 40 mm high is applied to the sample 5 times for 5 seconds. Two successive flame applications are separated in each case by intervals of 5 seconds. A substance is classified in fire class UL 94 5V if the combustion time or glowing combustion time of the samples does not exceed 60 seconds after the final flame application. Neither dripping of flaming or nonflaming particles nor complete combustion must occur.

The results of the UL-94 tests on 4 mm thick flame bars and the formulations in the Examples are as follows:

| Test Resin | A | B | C | D | E | F | mol % branching | wt % siloxane | V-0 | 5 V |
|---|---|---|---|---|---|---|---|---|---|---|
| Example 1 | 50 | 50 | 0 | 0 | 0 | 0 | 0.25 | 0.5 | Pass | Pass |
| Example 2 | 0 | 0 | 0 | 0 | 100 | 0 | 0.25 | 0.5 | Pass | Pass |
| Comparative Example 1 | 100 | 0 | 0 | 0 | 0 | 0 | 0.25 | 0 | Pass | Fail |
| Comparative Example 2 | 0 | 100 | 0 | 0 | 0 | 0 | 0.25 | 1 | Fail | Pass |
| Comparative Example 3 | 0 | 0 | 100 | 0 | 0 | 0 | 0.25 | 3 | Fail | Fail |
| Comparative Example 4 | 0 | 0 | 0 | 100 | 0 | 0 | 0.25 | 5 | Fail | Fail |
| Comparative Example 5 | 0 | 0 | 0 | 0 | 0 | 100 | 0 | 0.5 | Fail | Fail |

As can be seen in Examples 1 and 2, branched polycarbonate-polysiloxane copolymers with a relatively low level of polysiloxanes of about 0.5 wt. %, provide excellent fire retardance while maintaining transparency, even in the absence of halogenated polycarbonates and bromine and/or chlorine containing fire retardants. Comparative examples with no siloxane or high levels of siloxane fail either the UL 5V test or the UL V0 test, and a comparative example without branching fails the UL 5V test.

What is claimed is:

1. A transparent, fire resistant, branched polycarbonate-polysiloxane block copolymer composition comprising:
   a) polycarbonate blocks having recurring units of the formula:

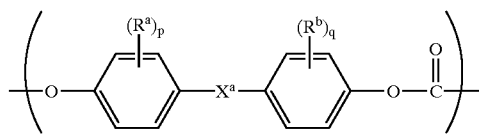

wherein $R^a$ and $R^b$ each represent a monovalent hydrocarbon group and may be the same or different; p and q are each independently integers from 0 to 4; and $X^a$ represents one of the groups of formula:

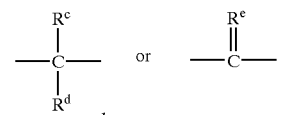

wherein $R^c$ and $R^d$ each independently represent a hydrogen atom or a monovalent linear or cyclic hydrocarbon group and $R^c$ is a divalent hydrocarbon group;
   b) a repeating or recurring polysiloxane unit derived from the reaction product of an allyl phenol and a polydiorganosiloxane of the formula:

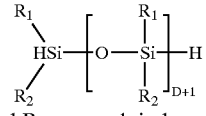

wherein $R_1$ and $R_2$ are each independently hydrocarbyl and where D is an integer of from about 5 to about 20;
   c) a polyfunctional organic branching agent containing at least three functional groups selected from the group consisting of hydroxyl, carboxyl, carboxylic anhydride, carboxylic acid chloride, and mixtures thereof; and
   d) flame retardant additives;
      wherein said polysiloxane unit is present in an amount of about 1 wt. % or less, based on the total weight of said branched polycarbonate-polysiloxane block copolymer.

2. The composition of claim 1 wherein the polysiloxane is present in amounts of about 0.25 to about 0.75 weight percent based on the total weight of the branched polycarbonate-polysiloxane block copolymer.

3. The composition of claim 2 wherein the polysiloxane is present in amounts of about 0.25 to about 0.50 weight percent based on the total weight of the branched polycarbonate-polysiloxane block copolymer.

4. The composition of claim 1 wherein said repeating or recurring polysiloxane unit has a value D of about 5 to 15, and said composition has a UL94 5V rating for fire resistance at thickness greater than or equal to about 4 millimeters.

5. The composition of claim 1 wherein the flame retardant includes materials selected from the group consisting of alkali metal salts of inorganic protonic acids, alkaline earth metal salts of inorganic protonic acids, alkali metal salts of organic BrÖnsted acids, alkaline earth metal salts of organic BrÖnsted acids.

6. The composition of claim 5 wherein the flame retardant includes potassium-perfluorobutane-sulphonate.

7. The composition of claim 1 wherein the flame retardant is present in amounts of about 0.05 wt % to about 0.2 wt % based on the total weight of the composition.

8. The composition of claim 1 further comprising at least one of: a heat stabilizer, antioxidant, light stabilizer, plasticizer, antistatic agent, mold releasing agent, additional resin, blowing agent or combinations thereof.

9. The composition of claim 1 wherein said a polyfunctional organic branching agent is selected from the group consisting of: trimellitic acid, trimellitic anhychide, trimellitic trichloride, tris-p-hydroxy phenyl ethane, isatin-bisphonol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol, trimesic acid, benzophenone tetracarboxylic acid, and mixtures thereof.

10. An article prepared from composition of claim 1.

11. A process for preparing a thermoplastic randomly branched polycarbonate-polysiloxane block copolymer composition, the process comprising:
a) charging to a reactor:
i. a dihydric phenol;
ii. a polysiloxane unit diol derived from the reaction product of an allyl phenol and a diorganopolysiloxane of the formula:

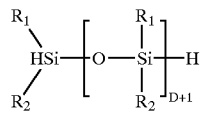

wherein $R_1$ and $R_2$ are each independently hydrogen, or hydrocarbyl and where D is an integer of from about 5 to about 20 and wherein said polysiloxane unit is present in an amount of about 1 wt. % or less based on the total weight of said branched polycarbonate-polysiloxane block copolymer
iii. water,
iv. a polyfunctional organic compound as a branching agent containing at least three functional groups selected from the group consisting of hydroxyl, carboxyl, carboxylic anhydride, carboxylic acid chloride, and mixtures thereof;
v. a catalytic proportion of a catalyst;
to form a heterogeneous reaction mixture having an organic phase and an aqueous phase;
b) agitating the reaction mixture to enhance the contact between the phases;
c) adding to the reaction mixture a carbonate precursor, and
d) copolymerizing the dihydric phenol, the branching agent, and the polysiloxane diol.

12. The process of claim 11 wherein the dihydric phenol is bisphenol-A.

13. The process of claim 11 wherein the catalyst is triethylamine.

14. The process of claim 11 wherein said carbonate precursor is phosgene.

15. The process of claim 11 wherein said repeating or recurring polysiloxane unit has a value D of about 5 to 15.

16. The process of claim 11 further comprising the step of:
compounding into said thermoplastic randomly branched polycarbonate-polysiloxane block copolymer composition a salt based flame retardant selected from the group consisting of alkali metal salts of inorganic protonic acids, alkaline earth metal salts of inorganic protonic acids, alkali metal salts of organic BrÖnsted acids, alkaline earth metal salts of organic BrÖnsted acids.

17. The process of claim 11 further comprising the step of:
compounding into said thermoplastic randomly branched polycarbonate-polysiloxane block copolymer composition at least one of: a heat stabilizer, antioxidant, light stabilizer, plasticizer, antistatic agent, mold releasing agent, additional resin, blowing agent or thereof.

18. The composition of claim 1, wherein the reaction product is of the formula:

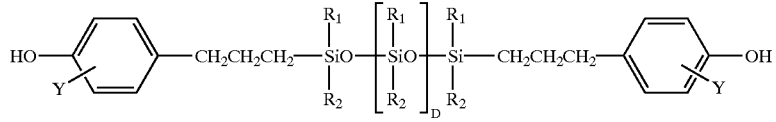

wherein Y is methoxy.

19. The process of claim 11, wherein the polysiloxane diol is

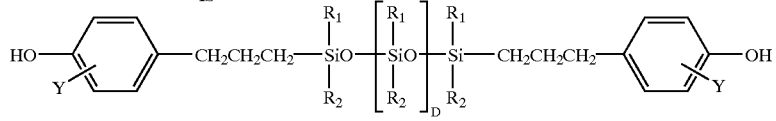

wherein Y is methoxy.

* * * * *

UNITED STATES PATENT AND TRADEMARK OFFICE
CERTIFICATE OF CORRECTION

PATENT NO. : 6,660,787 B2
DATED : December 9, 2003
INVENTOR(S) : James Alan Mahood, Niles Richard Rosenquist and Rajendra Kashinath Singh It is certified that error appears in the above-identified patent and that said Letters Patent is hereby corrected as shown below:

<u>Column 8,</u>
Line 49, delete "$R_c$" and insert -- $R_e$ --.

Signed and Sealed this

Sixteenth Day of May, 2006

JON W. DUDAS
*Director of the United States Patent and Trademark Office*